United States Patent
Han et al.

(10) Patent No.: US 7,251,382 B2
(45) Date of Patent: Jul. 31, 2007

(54) FUNCTIONAL TUNABLE MULTICHANNEL FILTER

(75) Inventors: Young Geun Han, Busan-Si (KR); Sang Hyuck Kim, Seoul (KR); Sang Bae Lee, Seoul (KR)

(73) Assignee: Korea Institute of Science and Technology, Daejon (KR)

(*) Notice: Subject to any disclaimer, the term of this patent is extended or adjusted under 35 U.S.C. 154(b) by 232 days.

(21) Appl. No.: 11/170,637

(22) Filed: Jun. 29, 2005

(65) Prior Publication Data
US 2006/0120656 A1 Jun. 8, 2006

(30) Foreign Application Priority Data
Dec. 2, 2004 (KR) ............... 10-2004-0100567

(51) Int. Cl.
*G02B 6/00* (2006.01)

(52) U.S. Cl. .................. 385/11; 385/27; 385/15; 356/519; 359/483

(58) Field of Classification Search ............ 385/27, 385/11, 15; 359/483; 356/519
See application file for complete search history.

(56) References Cited

U.S. PATENT DOCUMENTS 6,266,458 B1 * 7/2001 Ahn et al. ............. 385/11
6,943,871 B1 * 9/2005 Abedin ............. 356/73.1
7,130,495 B2 * 10/2006 Yamashita ............. 385/11

* cited by examiner

*Primary Examiner*—Frank G. Font
*Assistant Examiner*—James P. Hughes
(74) *Attorney, Agent, or Firm*—Harness, Dickey & Pierce, PLC

(57) ABSTRACT

Disclosed herein is a functional tunable multichannel filter which is capable of adjusting channel spacing and/or a wavelength location using polarization controllers ($\lambda/2$, $\lambda/4$). The functional tunable multichannel filter includes one or more polarization maintaining fibers, a first polarization controller ($\lambda/2$), a second polarization controller ($\lambda/4$) and a 3 dB coupler. Additionally, the functional tunable multichannel filter is configured to tune a wavelength and adjust channel spacing by adjusting polarization of an optical signal passing through each of the polarization maintaining fibers using the first and second polarization controllers.

7 Claims, 6 Drawing Sheets

FUNCTIONAL TUNABLE MULTICHANNEL FILTER

BACKGROUND OF THE INVENTION

1. Field of the Invention

The present invention relates generally to a functional tunable multichannel filter that includes one or more polarization maintaining fiber filters, polarization controllers (λ/2, λ/4) and a 3 dB coupler and, more particularly, to an independent functional tunable multichannel filter that is not influenced by the varying polarization of an input signal because it uses one or more polarization maintaining fiber filters, polarization controllers (λ/2, λ/4) and a 3 dB coupler.

2. Description of the Related Art

Existing multichannel filters include a fiber optic grating filter, a Mach-Zehnder interferometer and an arrayed waveguide grating. In the case of the optical fiber grating filter, a multichannel filter is implemented by connecting a plurality of gratings corresponding to respective wavelengths. Accordingly, the optical fiber grating, filter is disadvantageous in that the cost thereof is high and each grating filter must be tuned to achieve wavelength tuning. Although a wavelength position can vary by tuning each individual grating filter, it is difficult to adjust uniform channel spacing. Furthermore, when the optical fiber grating filter is commercialized, a problem occurs in that its size increases.

The Mach-Zehnder interferometer has multichannel filter characteristics when exact coincidence in variation in phase is achieved. However, the Mach-Zehnder interferometer is disadvantageous in that it is difficult to ensure stable performance because the coincidence in variation in phase is very sensitive to variation in outside temperature, vibration, strain or the like. Furthermore, the Mach-Zehnder interferometer is disadvantageous in that it is difficult to control a wavelength position and channel spacing.

Furthermore, the arrayed waveguide grating is disadvantageous in that the phase of each arrayed waveguide must be exactly adjusted, it is difficult to select a desired channel, and its size increases when commercialized. Although a wavelength position can easily vary with temperature, a problem occurs in that it is difficult to adjust channel spacing. Furthermore, the three conventional multichannel filters described above are sensitive to the varying polarization of an input signal and, therefore, it is necessary to reduce dependence on polarization.

SUMMARY OF THE INVENTION

Accordingly, the present invention has been made keeping in mind the above problems occurring in the prior art, and an object of the present invention is to provide a functional tunable multichannel filter that can vary channel spacing.

Another object of the present invention is to provide a functional tunable multichannel filter that can vary a wavelength position.

A further object of the present invention is to provide a functional tunable multichannel filter that is stable regardless of varying polarization of an input signal.

Yet another object of the present invention is to provide a functional tunable multichannel filter that has a low manufacturing cost and a small size.

In order to accomplish the above object, the present invention provides a functional tunable multichannel filter that is configured to vary channel spacing and wavelength position by varying the combination of one or more effective refractive indices and one or more effective lengths of one or more polarization maintaining fibers within a 3 dB coupler using polarization controllers (λ/2, λ/4).

The functional tunable multichannel filter in accordance with the present invention has reduced dependence on the polarization of the input signal, which is regarded as the disadvantage of the existing multichannel filters, and can simultaneously vary the channel spacing and the wavelength, so that a new type of functional tunable multichannel filter can be implemented.

BRIEF DESCRIPTION OF THE DRAWINGS

The above and other objects, features and advantages of the present invention will be more clearly understood from the following detailed description taken in conjunction with the accompanying drawings, in which.

DESCRIPTION OF THE PREFERRED EMBODIMENTS

Figure 1A:
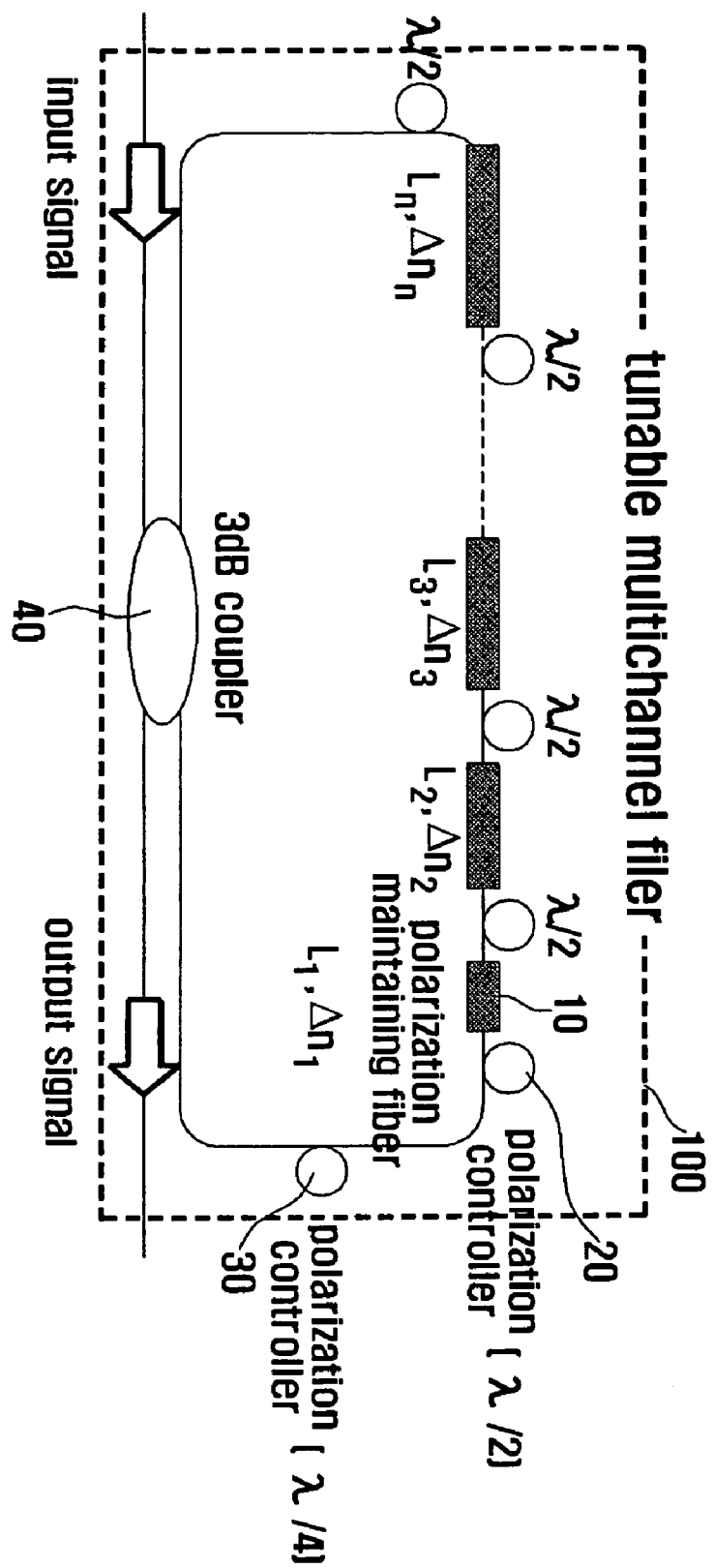
FIGS. 1a and 1b are views showing the construction of a functional multichannel filter using n polarization maintaining fibers in accordance with the present invention.
Figure 1B:
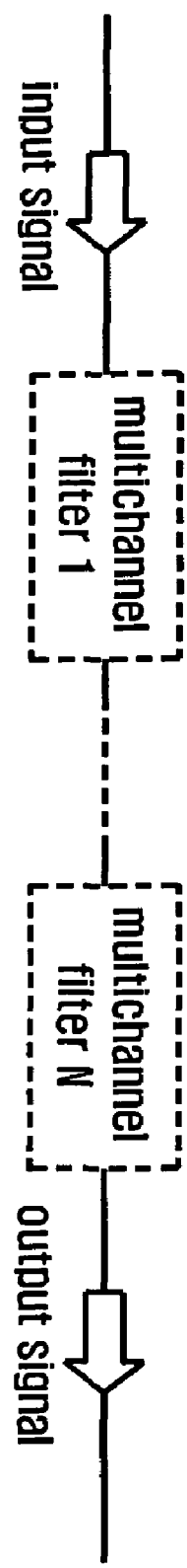
Figure 2:
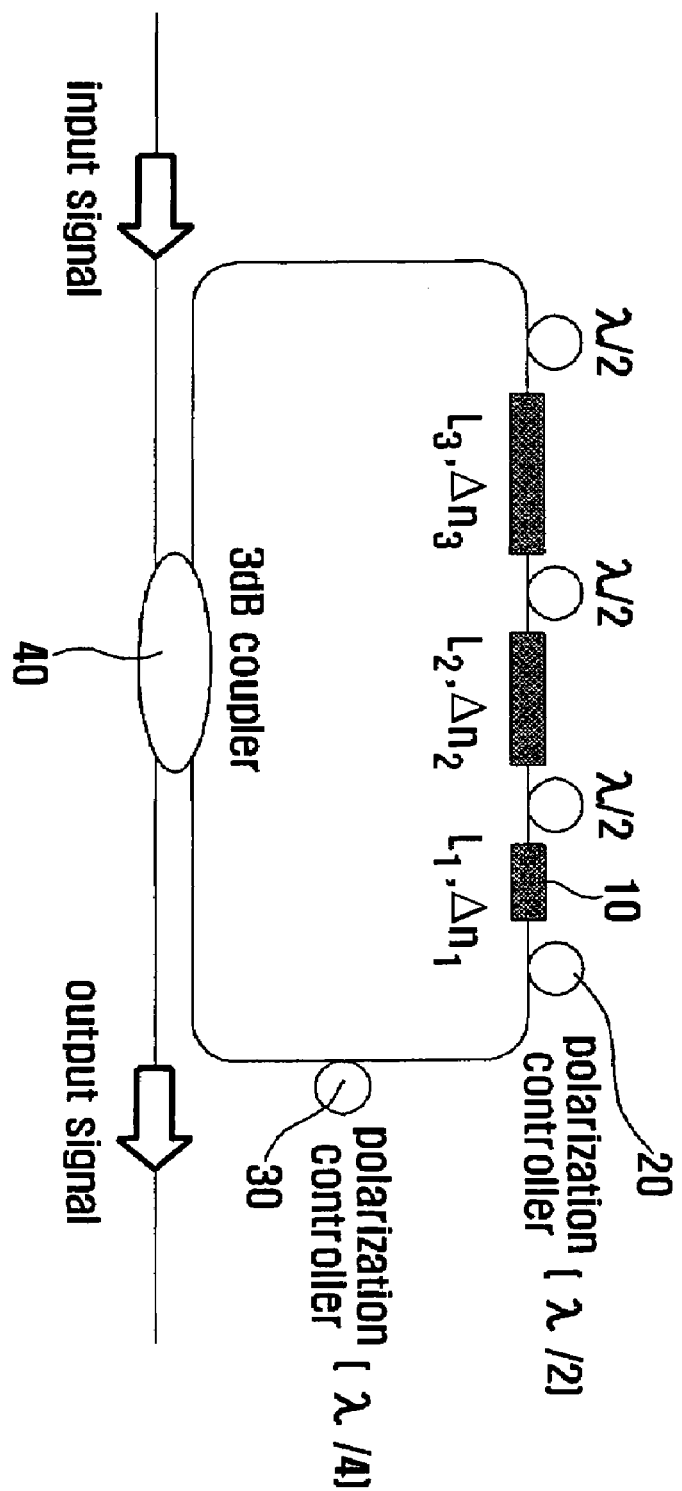
FIG. 2 is a view showing the construction of a functional tunable multichannel fiber filter including three polarization maintaining fibers, polarization controllers and a 3 dB coupler in accordance with an embodiment of the present invention.
Figure 3:
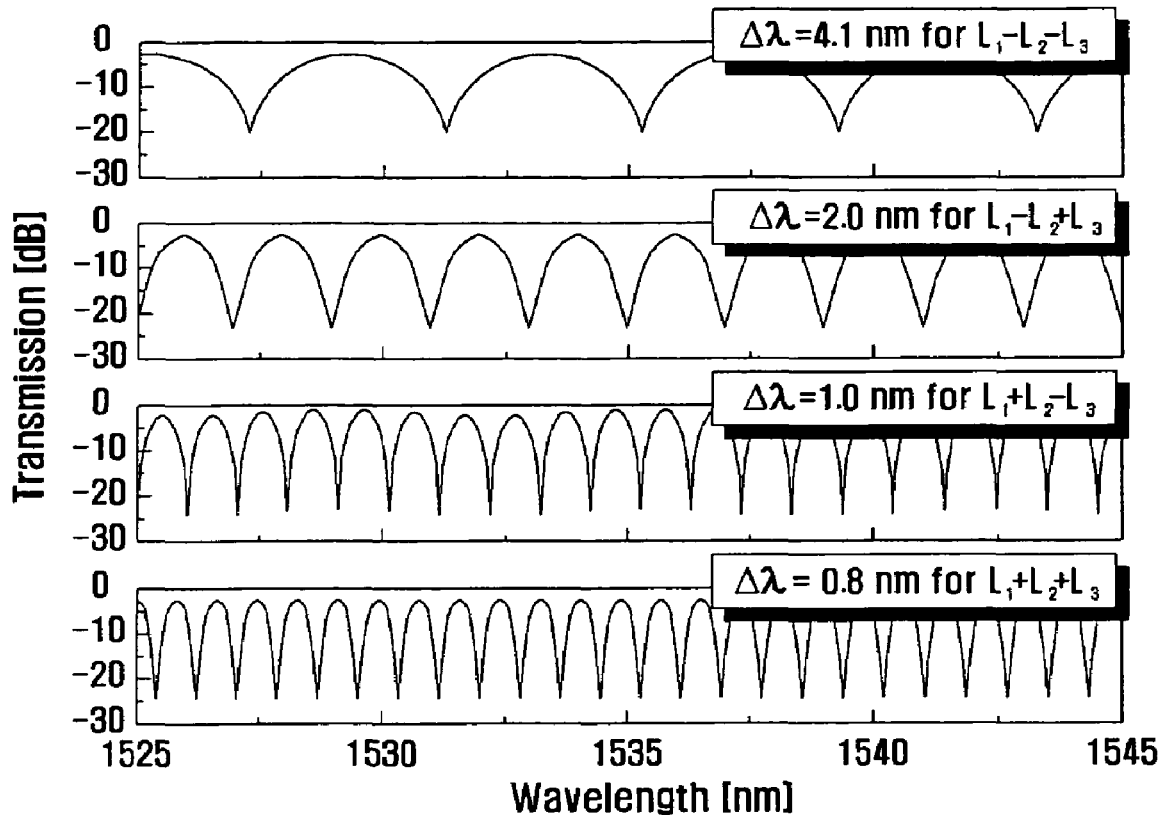
FIG. 3 is a view illustrating control of the channel spacing of the multichannel filter of the present invention using the polarization controller.
Figure 4:
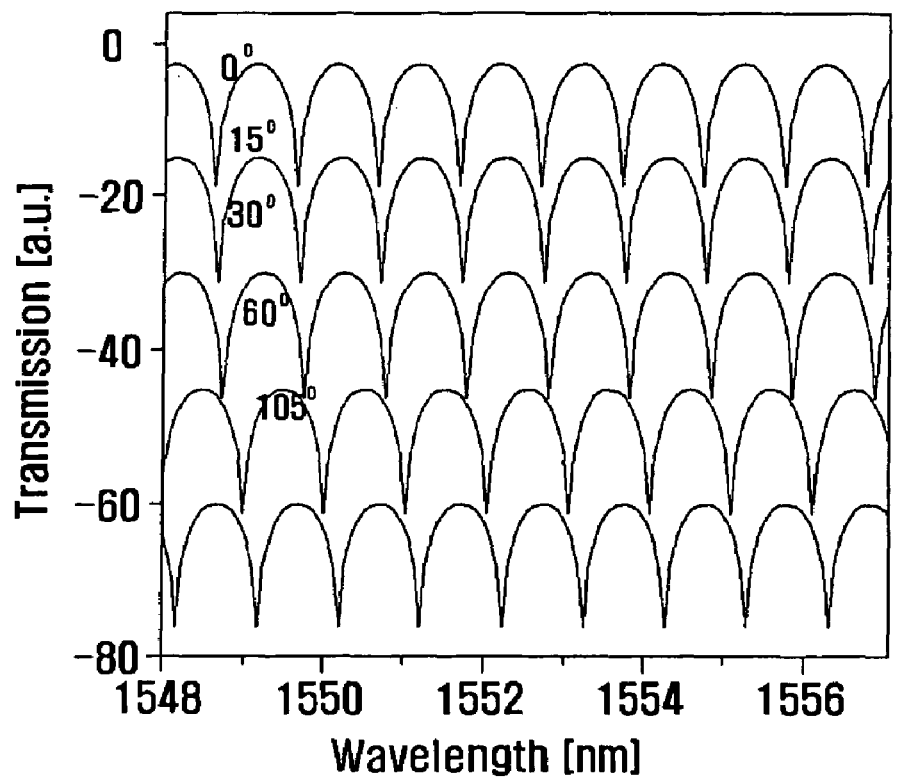
FIG. 4 is a view illustrating variation in wavelength depending on polarization in accordance with the embodiment of the present invention.
Figure 4:
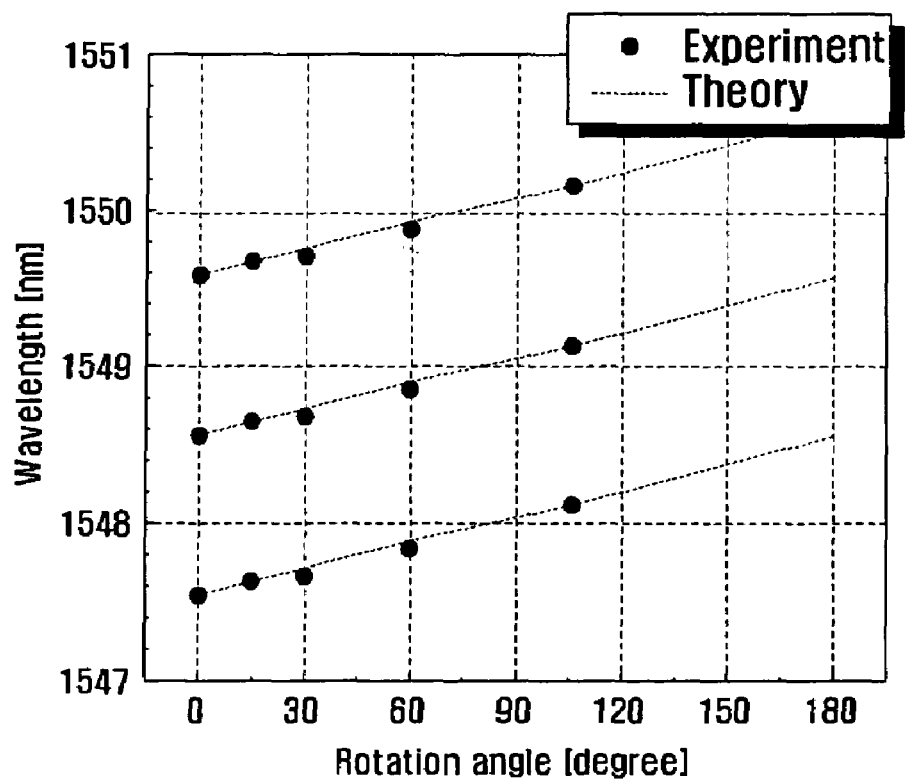
Figure 5:
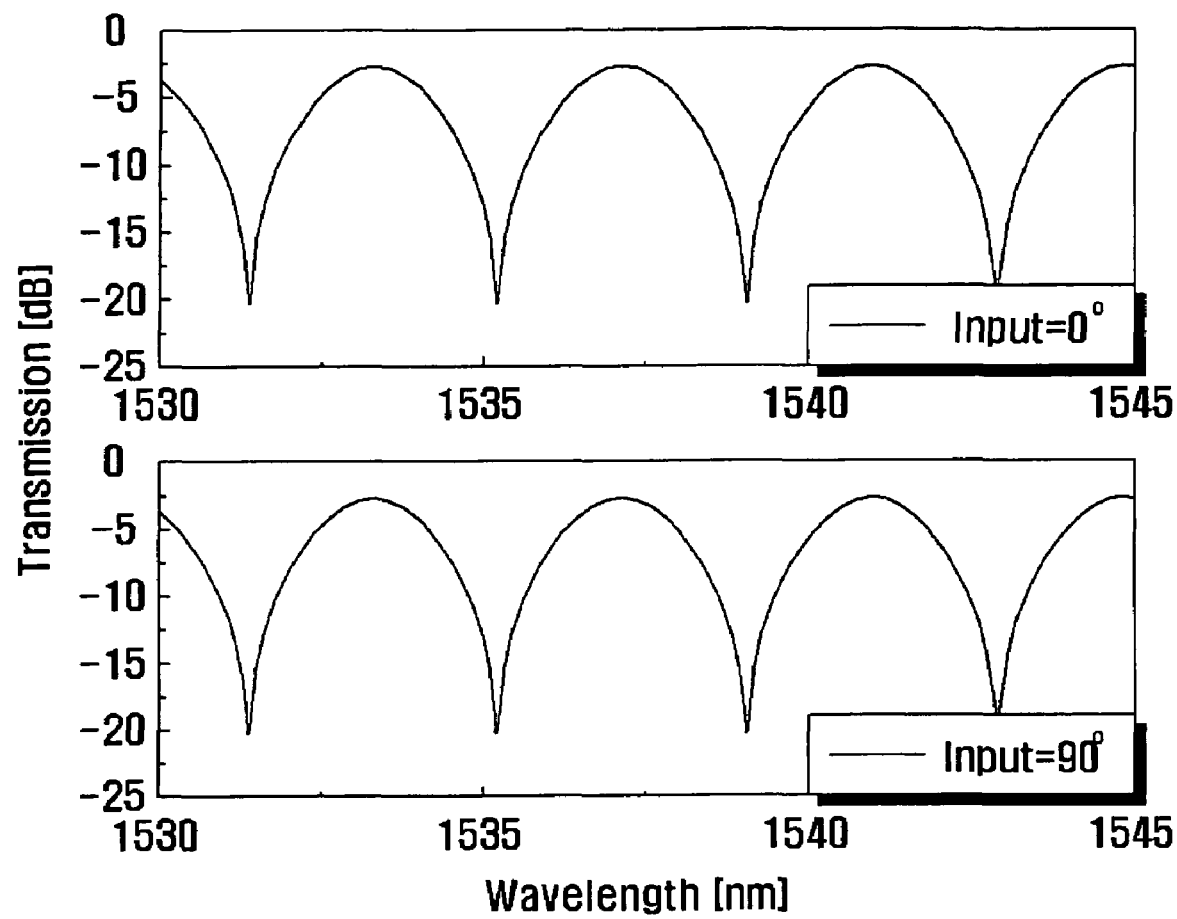
FIG. 5 is a view illustrating variation in output depending on polarization in accordance with the embodiment of the present invention.

FIGS. 1a and 1b are views showing the construction of a functional multichannel filter using n polarization maintaining fibers in accordance with the present invention. FIG. 2 is a view showing the construction of a functional tunable multichannel fiber filter including three polarization maintaining fibers, polarization controllers and a 3 dB coupler in accordance with an embodiment of the present invention. FIG. 3 is a view illustrating control of the channel spacing of the multichannel filter of the present invention using the polarization controller. FIG. 4 is a view illustrating variation in wavelength depending on polarization in accordance with the embodiment of the present invention. FIG. 5 is a view illustrating variation in output depending on polarization in accordance with the embodiment of the present invention.

As shown in FIG. 1a, the functional tunable multichannel filter 100 includes one or more polarization maintaining fibers 10, a first polarization controller (λ/2) 20, a second polarization controller (λ/4) 30 and a 3 dB coupler 40.

The functional tunable multichannel filter 100 constitutes a Lyot-Sagnac filter using the n polarization maintaining fibers 10 and the 3 dB coupler 40. The functional tunable multichannel filter 100 is configured to control wavelength tuning and channel spacing by controlling the varying polarization of an optical signal that passes through the polarization maintaining fiber 10 using the first and second polarization controller (λ/2, λ/4) 20 and 30.

In particular, the combination of effective refractive indices and effective lengths is controlled between two optical signals using the polarization controllers (λ/2, λ/4) 20 and

30, so that the wavelength and spacing of each channel can be effectively controlled, and the functional tunable multichannel filter 100 operates without being influenced by the varying polarization of an input signal.

In the functional tunable multichannel filter 100 of the present invention, the input signal is divided into two parts, and the two divided signals are transferred in clockwise and counterclockwise directions, respectively. The two divided optical signals undergo different phase variations while passing through the polarization maintaining fibers 10 and the polarization controllers 20 and 30, which are connected through multiple connections, and are then coupled with each other through the 3 dB coupler 40. In this case, interference occurs between the two optical signals, so that multichannel filter characteristics are imparted.

In this case, transmissivity T and channel spacing $\Delta\lambda$ can be expressed by the following Equations 1 and 2:

$$T = \sin^2\left[\frac{\pi}{\lambda}\Delta n \cdot L_{eff} + \theta\right] \quad (1)$$

$$\Delta\lambda = \frac{\lambda^2}{\Delta n \cdot L_{eff}} \quad (2)$$

where $\Delta n$ ($=n_x-n_y$) indicates the difference in refractive index of two vertical modes, and $L_{eff}$ indicates an effective length.

From Equations 1 and 2, it can be seen that transmission characteristics can be controlled by various combinations of both effective refractive indices and effective lengths of the polarization maintaining fibers 10 that are connected through multiple connections, and the channel spacing can also be controlled by various combinations thereof. Furthermore, during transmission, variation in phase of an optical signal varies a wavelength position. The multichannel filter of the present invention has one or more polarization maintaining fibers 10 connected through a single connection or multiple connections. The polarization of the optical signal is relatively varied by the polarization controller ($\lambda/2$) 20 when passing through the polarization maintaining fibers 10 connected through multiple connections. Due to such variation in phase, the combination of effective lengths experienced by the optical signal varies. In the case in which n polarization maintaining fibers are connected in series, $2^{n-1}$ channel spacings may be achieved. Furthermore, when the second polarization controller ($\lambda/4$) is used, the theta value $\theta$ can vary, so that the wavelength position and transmissivity can be controlled. Accordingly, the present invention can be utilized as the gain flattening filter of an optical amplifier through the implementation of non-uniform transmission spectra.

When the functional tunable multichannel filters are connected in series as shown in FIG. 1b, the same effect can be obtained.

FIG. 2 is a view showing an actual experimental setup in accordance with an embodiment of the present invention, which shows a functional tunable multichannel filter including three polarization maintaining fibers 10, first and second polarization controllers 20 and 30, and a 3 dB coupler 40. As described above, four combinations of effective lengths can be acquired because three polarization maintaining fibers 10 are used, so that four channel spacings can be realized. In the polarization maintaining fibers used for experiments, the lengths thereof were L1=6 m, L2=3 m and L3=1 m, respectively, and the difference in refractive index was $\Delta n$=0.0003.

FIG. 3 shows the results of experiments, which show that the channel spacing of the multichannel filter was controlled using the polarization controllers. In FIG. 3, it can be seen that the channel spacing can be effectively controlled by the polarization controller ($\lambda/2$) according to combination of effective lengths of the three polarization maintaining fibers.

FIG. 4 shows variation in wavelength depending on variation in polarization. That is, FIG. 4 shows the results of experiments, in which a wavelength position was tuned by varying the theta value $\theta$ of an optical signal using the polarization controller ($\lambda/4$). In particular, it can be seen that, when an electro-optic polarization controller is used, variation in polarization can be controlled by varying applied voltage, and a wavelength tunable multichannel filter having fast response speed can be implemented.

FIG. 5 shows variation in output depending on variation in polarization of an input signal, in which it can be seen that the tunable multichannel filter according to the present invention is not influenced by the varying polarization of the input signal. Accordingly, a multichannel filter that is stable regardless of varying polarization of the input signal can be implemented.

In accordance with the present invention, the multichannel filter varies the effective refractive indices and effective lengths of the polarization maintaining fibers within the 3 dB coupler using the polarization controller ($\lambda/2$), thus being capable of tuning channel spacing.

The dependence on polarization of the input signal, which is regarded as the disadvantage of existing multichannel filters, is reduced and the channel spacing and the wavelength can be also varied, so that a new type of functional tunable multichannel filter can be implemented.

Furthermore, a functional tunable multichannel filter that can control wavelength position using the polarization controller ($\lambda/4$) can be implemented.

Particularly, since a multichannel filter having a fast response speed can be implemented when electro-optic polarization controllers, which have fast response speed and are controlled by applied voltage, are used, a multichannel switch device, a signal gating device, an inteleaver and a multi-wavelength fiber laser can be easily implemented.

Although the preferred embodiments of the present invention have been disclosed for illustrative purposes, those skilled in the art will appreciate that various modifications, additions and substitutions are possible, without departing from the scope and spirit of the invention as disclosed in the accompanying claims.

What is claimed is:

1. A functional tunable multichannel filter, comprising:
   one or more polarization maintaining fibers;
   a first polarization controller ($\lambda/2$);
   a second polarization controller ($\lambda/4$); and
   a 3 dB coupler;
   wherein the functional tunable multichannel filter is configured to tune a wavelength and adjust channel spacing by adjusting polarization of an optical signal passing through each of the polarization maintaining fibers using the first and second polarization controllers.

2. A functional tunable multichannel filter, comprising:
   a plurality of functional tunable multichannel filter units connected in series;
   wherein each of the plurality of tunable multichannel filter units comprises one or more polarization maintaining fibers, a first polarization controller ($\lambda/2$), a second polarization controller ($\lambda/4$) and a 3 dB coupler, and are configured to tune a wavelength and adjust channel spacing by adjusting polarization of an optical signal passing through each of the polarization maintaining fibers using the first and second polarization controllers.

3. The functional tunable multichannel filter as set forth in claim 1 or 2, wherein each of the polarization maintaining fibers is a device having a double refractive property, which is selected from a group consisting of a silica fiber, a photonic crystal fiber, a bulk polarization maintaining device and a polymer fiber.

4. The functional tunable multichannel filter as set forth in claim 1 or 2, wherein the first polarization controller controls channel spacing of the optical signal.

5. The functional tunable multichannel filter as set forth in claim 1 or 2, wherein the second polarization controller controls a channel position of the optical signal.

6. The functional tunable multichannel filter as set forth in claim 1 or 2, wherein an input signal is divided into two parts, and the two divided signals are transferred in a clockwise direction and a counterclockwise direction, respectively, and undergo different phase variation while passing through the polarization maintaining fibers and the first and second polarization controllers connected to each other through multiple connections and then coupled with each other through the 3 dB coupler.

7. The functional tunable multichannel filter as set forth in claim 6, wherein interference occurs between the two optical signals, so that multichannel filter characteristics are imparted.

* * * * *